United States Patent
Eckert

[11] Patent Number: 6,126,881
[45] Date of Patent: Oct. 3, 2000

[54] ROTOMOLDING PROCESS TO FORM A PRODUCT HAVING MULTIPLE COLORS IN A NON-RANDOM, SEQUENTIALLY SEGREGATED AND CONTROLLED PATTERNS

[75] Inventor: Thomas Eckert, Columbia, Md.

[73] Assignee: Riva Sports, LLC, Bethesda, Md.

[21] Appl. No.: 09/221,485

[22] Filed: Dec. 24, 1998

[51] Int. Cl.[7] .................................................. B29C 39/12
[52] U.S. Cl. ......................... 264/245; 264/301; 264/310; 425/130; 425/429
[58] Field of Search .................................. 264/301, 303, 264/310, 311, DIG. 60, 245; 425/130, 429

[56] References Cited

U.S. PATENT DOCUMENTS

| | | | |
|---|---|---|---|
| 4,032,600 | 6/1977 | MacAdams et al. | 525/211 |
| 4,610,620 | 9/1986 | Gray | 425/434 |
| 4,692,293 | 9/1987 | Gray | 264/245 |
| 5,093,066 | 3/1992 | Batchelder et al. | 264/245 |
| 5,316,715 | 5/1994 | Gray | 264/245 |

FOREIGN PATENT DOCUMENTS

| | | | |
|---|---|---|---|
| 2 174 953 | 11/1986 | United Kingdom | 264/310 |
| 2 267 675 | 12/1993 | United Kingdom | 234/310 |
| 2 267 677 | 12/1993 | United Kingdom | 264/310 |

*Primary Examiner*—Jan H. Silbaugh
*Assistant Examiner*—Stefan Staicovici
*Attorney, Agent, or Firm*—Steven N. Fox, Esq.

[57] ABSTRACT

A process for forming a product having multiple and well defined color patterns. In a first embodiment, the rotomolding process comprises a first step of using a first powder having a first color and a second powder having a second color which is different than the color of the first powder. The rotomolding process comprises a second step of placing the first and second color powders into a pre-determined pattern within a hollow cavity mold. The rotomolding process comprises a third step of placing the closed hollow cavity mold into the oven. The rotomolding process comprises a fourth step of heating the hollow cavity mold with no rotation for a first period defined by the heating time necessary for a layer of individual colors to melt in the desired pattern upon the inside surface of the hollow cavity mold. The rotomolding process comprises a fifth step of rotating the hollow cavity mold in a bi-axis manner while heating the hollow cavity mold for a second period of time defined by the heating time necessary to completely melt the remaining material in the hollow cavity mold. The rotomolding process comprises a sixth step of cooling the hollow cavity mold to solidify the product. The rotomolding processes comprises a seventh step of removing the product from the hollow cavity mold. The resulting product comprises a first color pattern having the color of the first color powder and a second color pattern having the color of the second color powder.

1 Claim, 7 Drawing Sheets

34 — use Virgin Powder having any rotomoldable size preferably of about 35 mesh.

36 — forming a colored powder by blending the Virgin Powder with a desired dry color pigment powder in a high speed or tumble mixer (hereinafter the "First Color Powder") with a different dry color pigment in a high speed or tumble mixer (hereinafter the "Second Color Powder").

38 — placing the First and Second Color Powders on the inside surface 26 of the lower cavity 16 in a predetermined pattern..

40 — heating the hollow cavity mold 14 with no rotation for a first period of time equal to the heating time necessary to form adequate epidermal layers corresponding to the First and Second Color Powders on the inside surface 26 of the lower cavity 16 (hereinafter the "First Initial Time Period").

42 — bi-axis rotation of the hollow cavity mold 14 about the major and minor axis while heating for a final period of time (the balance of the predetermined oven cycle) equal to the heating time necessary to completely melt the remaining material in the hollow cavity mold 14 to form a nominal and universal wall thickness for the entire product 22 (hereinafter the "Final Time Period").

44 — cooling the hollow cavity mold 14 to solidify the melted First and Second Color Powders.

46 — removing the product 24 from the hollow cavity mold 14 resulting in a product 24 having permanent and predetermined color patterns 28 and 30 on its outside surface 32. The color patterns 28 and 30 are well defined and have substantially no migration of color at their interface.

FIG. 4

64 — obtaining the First Color Powder.

66 — obtaining pellets having a color different from the First Color Powder (hereinafter the "First Color Pellets").

68 — placing the First Color Pellets on the inside surface 26 of the lower cavity 16. The pattern of the First Color Pellets may be temporarily fixed by adhesive.

70 — placing the First Color Powder on the inside surface 26 of the lower cavity 16 and adjacent to the First Color Pellets.

72 — heating the hollow cavity mold 14 with no rotation for a first period of time equal to the heating time necessary to form adequate epidermal layers corresponding to the First Color Powder and the First Color Pellets on the inside 26 of the lower cavity 16 (hereinafter the "First Initial Time Period").

74 — biaxis rotation of the hollow cavity mold 14 about the major and minor axis while heating for a final period of time (the balance of the predetermined oven cycle) equal to the heating time necessary to completely melt the remaining material in the hollow cavity mold 14 to form a nominal and universal wall thickness for the entire product 22 (hereinafter the "Final Time Period").

76 — cooling the hollow cavity mold 14 to solidify the melted First Color Powder and the First Color Pellets.

78 — removing the product 22 from the hollow cavity mold 14 resulting in a product 22 having an outside surface 32 exhibiting a plurality of droplets having the color of the First Color Pellets against a uniform background having the color of the First Color Powder.

FIG. 7

```
                                    ┌─100
┌────────────────────────────────────┴──────────────────────────────────────────┐
│ using First and Second Color Powders 48 and 50 as described in the first embodiment of │
│ the present invention. The First and Second Color powders are of different colors and │
│ may for example have the colors of dark blue and light blue.                  │
└───────────────────────────────────────────────────────────────────────────────┘
                                    ┌─102
┌────────────────────────────────────┴──────────────────────────────────────────┐
│ using a third color powder 104 which except for its color is similar to the First and │
│ Second Color Powders and which is used as background color (hereinafter "The Third │
│ Color Powder 104"). The Third Color Powder 104 may have the color of white.   │
└───────────────────────────────────────────────────────────────────────────────┘
                                    ┌─105
┌────────────────────────────────────┴──────────────────────────────────────────┐
│ using the First Color Pellets 80. The color of the First Color Pellets may be the same │
│ color as the color of the Third Powder, namely, light blue.                   │
└───────────────────────────────────────────────────────────────────────────────┘
                                    ┌─106
┌────────────────────────────────────┴──────────────────────────────────────────┐
│ placing the First Color Pellets 80 on the inside surface 26 of the lower cavity 16. The │
│ pattern of the First Color Pellets may be temporarily fixed by adhesive (not shown). │
└───────────────────────────────────────────────────────────────────────────────┘
                                    ┌─108
┌────────────────────────────────────┴──────────────────────────────────────────┐
│ placing the First, Second and Third Color powders 48, 50 and 104 on the inside surface │
│ 26 of the lower cavity 16 and adjacent to the First Color Pellets 80.         │
└───────────────────────────────────────────────────────────────────────────────┘
                                    ┌─110
┌────────────────────────────────────┴──────────────────────────────────────────┐
│ heating the hollow cavity mold 14 with no rotation for a first period of time equal to the │
│ heating time necessary to form adequate epidermal layers corresponding to the First │
│ Color Powder 48, the Second Color Powder 50, the Third Color Powder 104, and the │
│ First Color Pellets 80 on the inside surface of the lower cavity 16 (hereinafter the First │
│ Initial Time Period").                                                        │
└───────────────────────────────────────────────────────────────────────────────┘
                                    ┌─112
┌────────────────────────────────────┴──────────────────────────────────────────┐
│ bi-axis rotation of the hollow cavity mold 14 about the major and minor axis while │
│ heating for a final period of time (the balance of the predetermined oven cycle) equal to │
│ the heating time necessary to completely melt the remaining material in the hollow cavity │
│ mold 14 to form a nominal and universal wall thickness for the entire product 24 │
│ (hereinafter the "Final Time Period").                                        │
└───────────────────────────────────────────────────────────────────────────────┘
                                    ┌─114
┌────────────────────────────────────┴──────────────────────────────────────────┐
│ cooling the hollow cavity mold 14 to solidify the melted First Color Powder 48, the │
│ Second Color Powder 50, the Third Color Powder 104, and the First Color Pellets 80. │
└───────────────────────────────────────────────────────────────────────────────┘
                                    ┌─116
┌────────────────────────────────────┴──────────────────────────────────────────┐
│ removing the product 24 from the hollow cavity mold 14. The resulting product 24 has │
│ an outside surface 32 exhibiting a first color 90 fading into a second color 92 fading into │
│ a background 94 having a plurality of droplets 62 disposed therein.           │
└───────────────────────────────────────────────────────────────────────────────┘
```

FIG. 10

ROTOMOLDING PROCESS TO FORM A PRODUCT HAVING MULTIPLE COLORS IN A NON-RANDOM, SEQUENTIALLY SEGREGATED AND CONTROLLED PATTERNS

FIELD OF THE INVENTION

The present invention relates generally to the manufacture of commercial products using a rotomolding process. More particularly, the present invention relates to the manufacture of products by a rotomolding process to form predetermined and defined color patterns on the exterior surface of the product.

BACKGROUND OF THE INVENTION

Products made from plastic are commonly manufactured by a variety of molding processes, including blow molding, injection molding, thermoforming, and rotational molding or rotomolding. Conventional rotomolding processes typically use a rotomolding machine 12 (FIG. 1) having a hollow cavity mold 14 mounted upon a rotomolder arm 20 and disposed within an oven 22. The hollow cavity mold 14 may have a variety of designs depending upon the shape of the product to be produced. A typical hollow cavity mold 14 has a two-piece construction and consists of a lower cavity 16 having an inside surface 26 and an upper cavity 18. The rotomolding machine 12 is typically designed such that the rotomolder arm 20 can bi-axially rotate the hollow cavity mold 14 about its major or minor axis or simply rotate the hollow cavity mold 14 about a single axis. In conventional rotomolding processes, a charge or shot weight of material is placed into the lower cavity 16 of the hollow cavity mold 14 and the hollow cavity mold 14 is heated under bi-axial rotation until the material within the hollow cavity mold 14 is melted into successive layers to form a single wall structure. The hollow cavity mold 14 is then cooled and opened and the resulting product is removed. The material used for the charge or shot weight of the rotomolding process is typically derived from virgin polyethylene in the form of pellets having no color (hereinafter the "Virgin Pellets"). If a color is desired, the Virgin Pellets may be processed by hot melting color compounds into the virgin material to produce color pellets (hereinafter the "Color Pellets"). The Virgin and/or Color Pellets are produced in a variety of sizes from "standard" to "micro." Typically, the Virgin and/or Color Pellets are typically ground into a powder of 35 mesh particle size for use by the rotomolder (hereinafter the "Virgin Powder" and "Compound Powder", respectively). In the case of a Virgin Powder, a rotomolder can dry blend pigment color powder into the Virgin Powder to form a dry color powder (hereinafter the "Dry Color Powder").

The use of rotomolding processes to form a product having multiple and well defined color patterns has not been successful.

SUMMARY OF THE INVENTION

The present invention is a process for forming a product having multiple and well defined color patterns. The various embodiments of the rotomolding process described herein refer to a rotomolding machine having an oven and a two-piece hollow cavity mold having a lower cavity and an upper cavity. It will be readily apparent to those of skill in the art that the process of the present invention can be easily used in connection with a wide variety of cavity molds and rotomolding machines to produce a wide variety of products shapes having multiple and well defined color patterns. In a first embodiment of the present invention, the rotomolding process comprises a first step of using a first powder having a first color and a second powder having a second color which is different than the color of the first powder. Each of the first and second color powders comprise a blend of a ground powder made from virgin polyethylene having a particle size of about 35 mesh and a dry color pigment. The rotomolding process comprises a second step of placing the first and second color powders into a pre-determined pattern within the lower cavity of the hollow cavity mold. The rotomolding process comprises a third step of placing the closed hollow cavity mold into the oven. The rotomolding process comprises a fourth step of heating the hollow cavity mold with no rotation for a first period defined by the heating time necessary for a layer of individual colors to melt in the desired pattern upon the lower cavity. The rotomolding process comprises a fifth step of rotating the hollow cavity mold in a bi-axis manner while heating the hollow cavity mold for a second period of time defined by the heating time necessary to completely melt the remaining material in the hollow cavity mold. The rotomolding process comprises a sixth step of cooling the hollow cavity mold to solidify the product. The rotomolding processes comprises a seventh step of removing the product from the hollow cavity mold. The resulting product comprises a first pattern having the color of the first color powder and a second pattern having the color of the second color powder.

BRIEF DESCRIPTION OF THE DRAWINGS

The following description of the invention will be better understood with reference to the accompanying drawings in which:

FIG. 4 is a flow chart of the first embodiment of the rotomolding process;

FIG. 7 is a flow chart of the second embodiment of the rotomolding process;

FIG. 10 is a flow chart of the third embodiment of the rotomolding process.

DETAILED DESCRIPTION OF THE PREFERRED EMBODIMENTS

Figure 1:
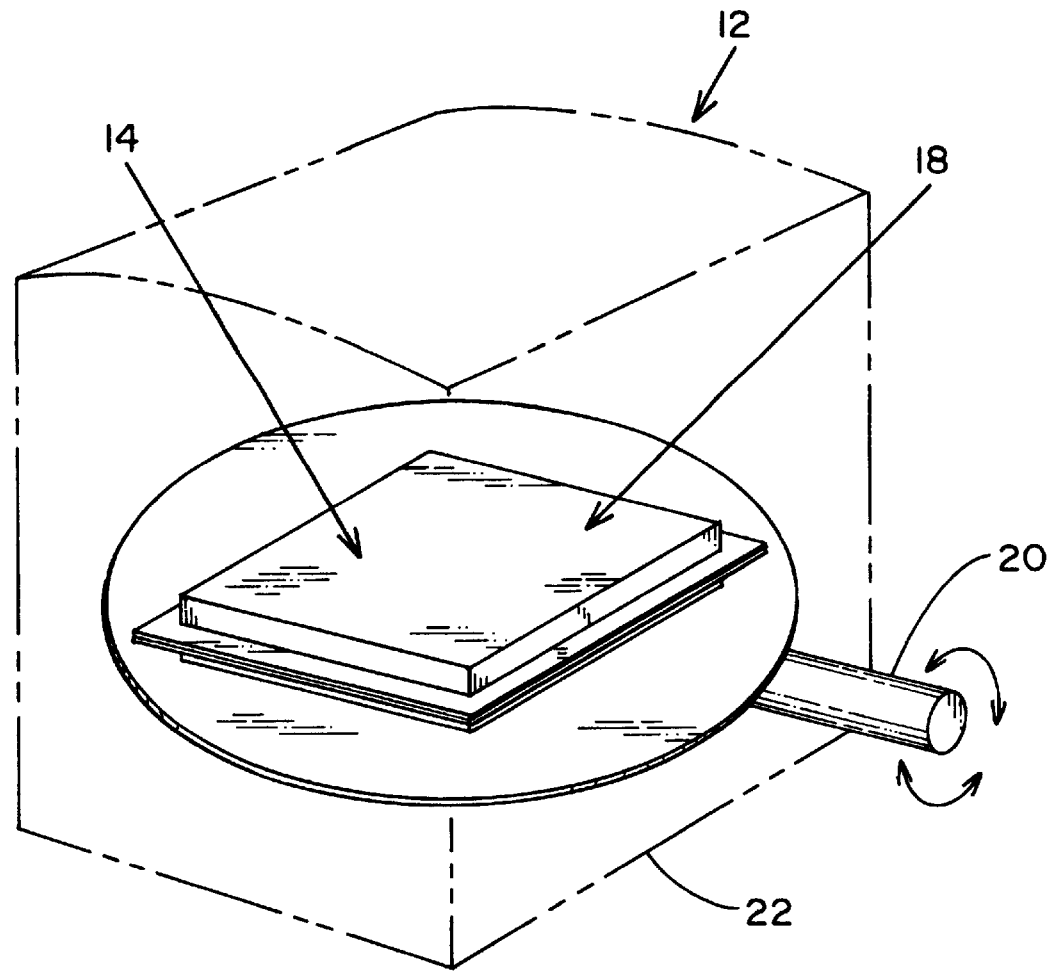
FIG. 1 is a perspective view of a conventional rotomolding machine.
Figure 2:
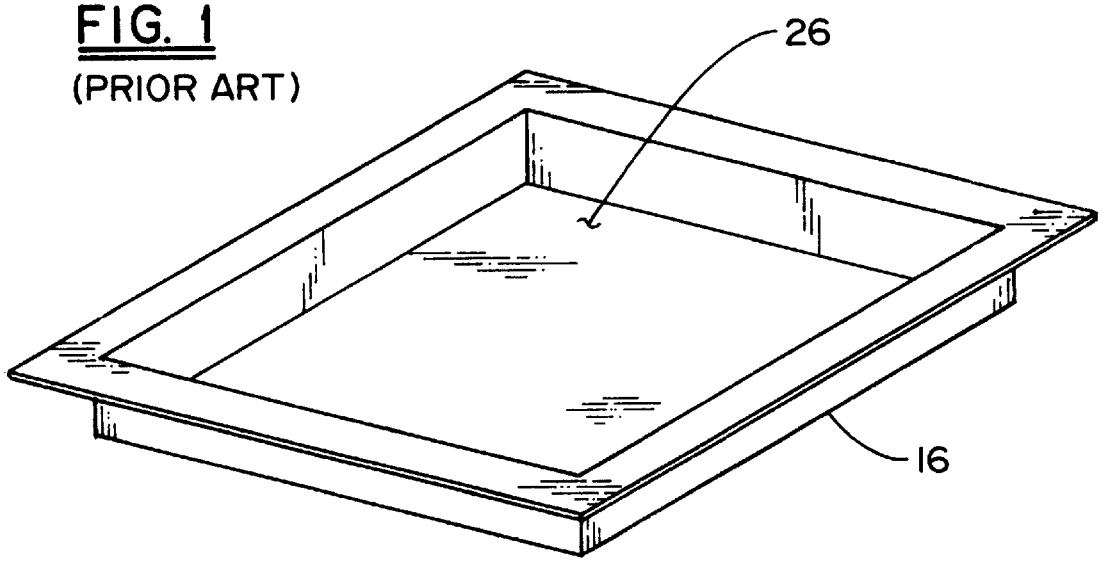
FIG. 2 is a perspective view of a conventional hollow cavity mold.
Figure 3:
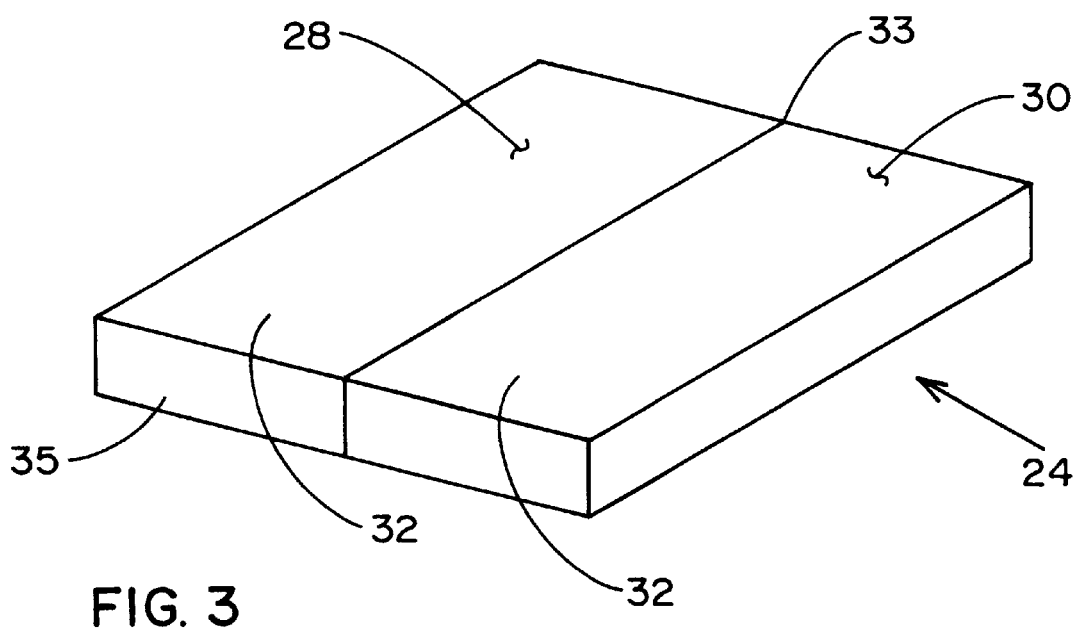
FIG. 3 is a perspective view of a product formed by a first embodiment of the rotomolding process of the present invention.

Referring to FIG. 3, wherein a product 24 in accordance with a first embodiment of a rotomolding process 10 is formed to have color patterns 28 and 30 on its exterior surface 32. The color patterns 28 and 30 are clearly defined.

Referring to FIG. 4, wherein the first embodiment of the rotomolding process 10 is described. As shown by block 34, the first step of the rotomolding process 10 is to obtain and use a ground powder made from virgin polyethylene having any rotomoldable size particles (hereinafter the "Virgin Powder"). The Virgin Powder is preferably about 35 mesh particle size.

As shown by block 36, the next step in the rotomolding process 10 is to form a first colored powder by blending the Virgin Powder with a desired dry color pigment powder in a high speed or tumble mixer (hereinafter the "First Color Powder") and a second colored powder by blending the Virgin Powder with a different dry color pigment in a high speed or tumble mixer (hereinafter the "Second Color Powder").

Figure 5:
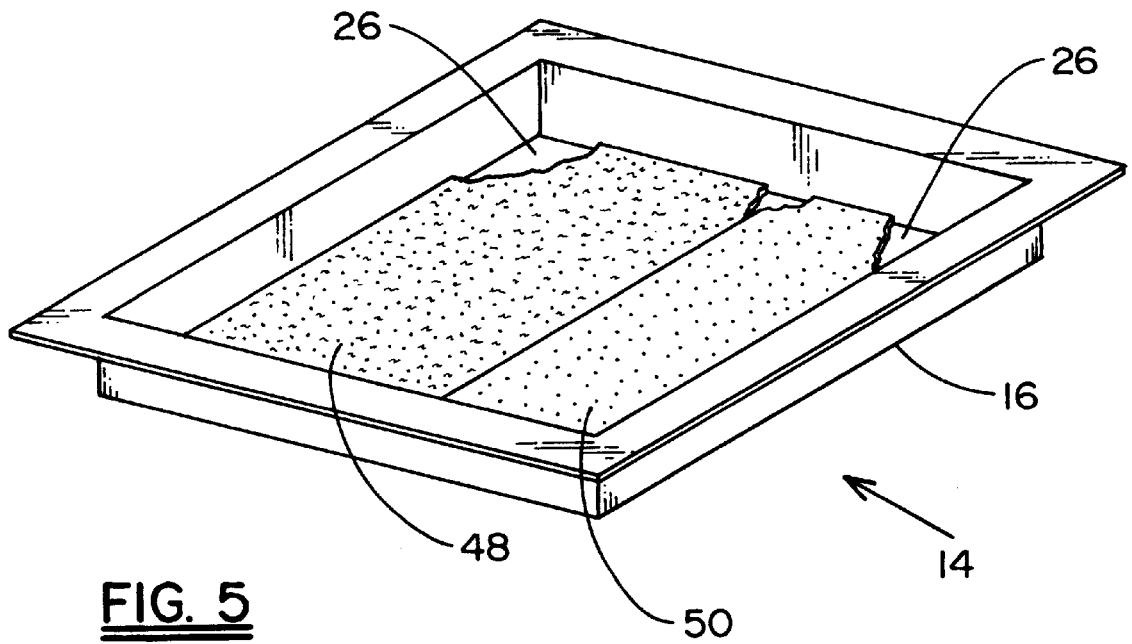
FIG. 5 is a perspective view showing a first color powder and a second color powder selectively positioned in the lower cavity of the hollow cavity mold for use in the first embodiment of the rotomolding process.

As shown by block 38 and FIG. 5, the next step in the rotomolding process 10 is to position or place the First and Second Color Powders 48 and 50 into a predetermined pattern on the inside surface 26 of the lower cavity 16.

As shown by block 40, the next step in the rotomolding process 10 is to heat the hollow cavity mold 14 with no rotation for a first period defined by the heating time necessary for the First and Second Color Powders 48 and 50 to form a fixed epidermal layer upon the inside surface 26 of the hollow cavity mold 14 (hereinafter the "First Initial Time Period"). If color patterns 28 and 30 are desired on both (or more than one) sides of the product 24, the rotomolding process 10 may comprise the additional steps of (1) rotating the hollow cavity mold 14 to a new fixed position to allow the remaining First and Second Color Powders to enter the upper cavity 18 under the force of gravity and (2) heating the hollow cavity mold 14 with no rotation for a second period defined by the heating time necessary for the First and Second Color Powders 48 and 50 to form a fixed epidermal layer on the inside surface (not shown) of the upper cavity 18 (hereinafter the "Second Initial Time Period"). The amount of rotation is dependent upon the shape of the cavity mold used and which sides of the product the color patterns 28 and 30 are desired. In the case of elongated product 24, the hollow cavity mold 14 would be rotated about 180 degrees so that the remaining First and Second Color Powders 48 and 50 to enter the upper cavity 18 under the force of gravity. Non-rotation of the hollow cavity mold 14 during the First Initial Time Period (and if desired, the Second Initial Time Period) of the oven cycle is essential to allow the First and Second Color Powders to form a fixed epidermal layer upon the inside surface 26 of the lower cavity 16. In some cases, the hollow cavity mold 14 may be rotated about one of its axis during the First and Second Initial Time Periods of the oven cycle. The use of any rotation of the hollow cavity mold 14 about one of its axis during the First and Second Initial Time Periods of the oven cycle is dependent upon whether any such rotation would prevent the First and Second Color Powders 48 and 50 from forming a fixed and well defined epidermal layer upon the desired surface of the hollow cavity mold 14. Complete non-rotation of the hollow cavity mold 14 should be used if any amount of single axis rotation would prevent the First and Second Color Powders 48 and 50 from forming a fixed and well defined epidermal layer upon the desired surface of the hollow cavity mold 14 during the First and Second Initial Time Periods of the oven cycle.

As shown by block 42, the next step in the rotomolding process 10 is to begin bi-axis rotation of the hollow cavity mold 14 about its major and minor axis while heating the hollow cavity mold 14 for a final period of time (the balance of the pre-determined oven cycle) defined by the heating time necessary to completely melt the remaining First and Second Color Powders 48 and 50 (hereinafter the "Final Time Period"). After the First and Second Initial Time Periods of the oven cycle are complete (i.e., the color patterns 28 and 30 are established on the inside surface 26 of the lower cavity 14), the rotomolding molding machine 12 is released or changed to standard bi-axial rotation to form a nominal and universal wall thickness for the entire product 24. Bi-axial rotation of the hollow cavity mold 14 during the Final Time Period will not disturb the epidermal layer of the primary color pattern but will cause the remainder of the unmelted First and Second Color Powders 48 and 50 to melt and combine into the sum color of their individual colors.

As shown by block 44, the next step in the rotomolding process 10 is to cool the hollow cavity mold 14 to solidify the melted First and Second Color Powders 48 and 50.

As shown by block 46, the next step in the rotomolding process 10 is to remove the product 24 from the hollow cavity mold 14. The resulting product 24 is formed with the first color pattern 28 having the same color as the First Color Powder and a second color pattern 30 having the same color as the Second Color Powder. The interior of the product 24 will exhibit a single color which is the sum of the colors of the First and Second Color Powders.

Figure 6:
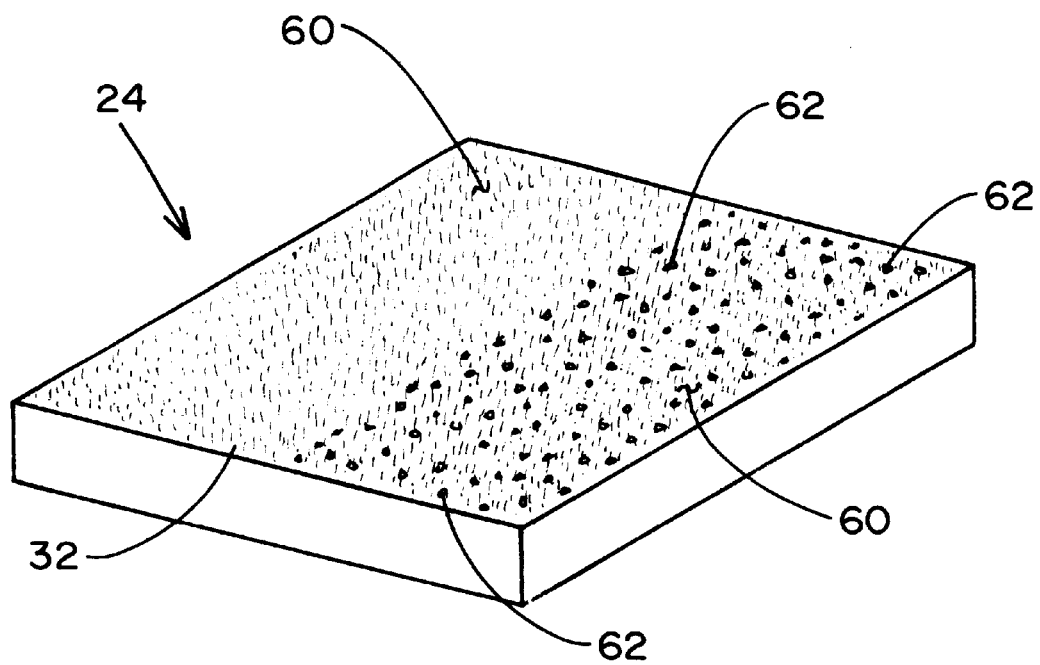
FIG. 6 is a perspective view of a product formed by a second embodiment of the rotomolding process of the present invention.
Figure 8:
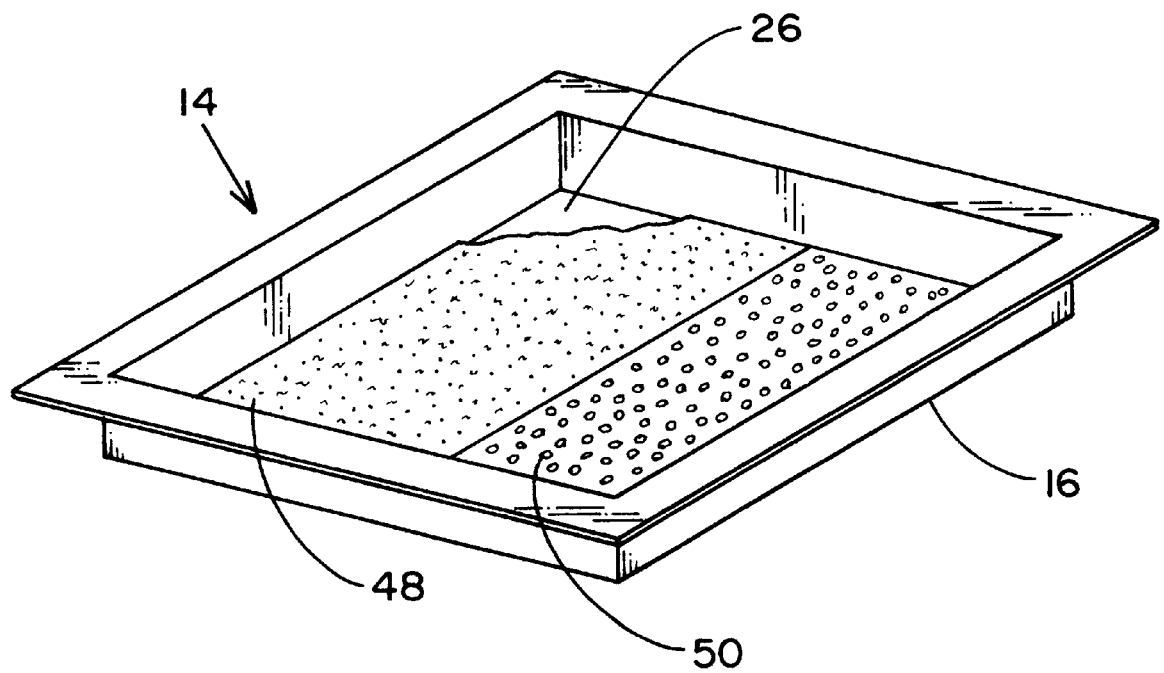
FIG. 8 is a perspective view showing a first color powder and first color pellets selectively positioned in the lower cavity of the hollow cavity mold for use in the second embodiment of the rotomolding process.

Referring to FIGS. 6–8, wherein a second embodiment of the rotomolding process 10 is described with. The product 24 formed by the rotomolding process 10 of the second embodiment comprises an outside surface 32 having a plurality of droplet color patterns 62 selectively positioned against a background color pattern 60. The color of the droplet color patterns 62 is pre-determined and is different from the color of the background color pattern 60. The image of the droplet color patterns 62 against the background color pattern 60 is well defined and has substantially no migration of color at their interfaces.

As shown by block 64, the rotomolding process 10 comprises the step of using a First Color Powder as described in the first embodiment of the present invention.

As shown by block 66, the rotomolding process 10 further comprises the step of using Virgin Pellets 80 having a color different from the First Color Powder (hereinafter the "First Color Pellets 80").

As shown by block 68, the rotomolding process 10 further comprises the step of placing the First Color Pellets 80 on the inside surface 26 of the lower cavity mold 16.

As shown by block 70, the rotomolding process 10 further comprises the step of placing the First Color Powder 48 on the inside surface 26 of the lower cavity 16 and adjacent to the First Color Pellets 80.

As shown by block 72, the rotomolding process 10 further comprises the step of heating the hollow cavity mold 14 with no rotation during the First Initial Time Period to allow the First Color Powder 48 and the First Color Pellets 80 to form adequate epidermal layers on the inside surface 26 of the lower cavity 16.

As shown by block 74, the rotomolding process 10 further comprises the step of bi-axis rotation of the hollow cavity mold 14 about the major and minor axis while heating during the Final Time Period to completely melt the remaining material in the hollow cavity mold 14 to form a nominal and universal wall thickness for the entire product 24.

As shown by block 76, the rotomolding process 10 further comprises the step of cooling the hollow cavity mold 14 to solidify the melted First Color Powder 48 and the First Color Pellets 80.

As shown by block 78, the rotomolding process 10 further comprises the step of removing the product 24 from the hollow cavity mold 14. The resulting product 24 has an outside surface 32 having a plurality of droplet color patterns 62 selectively positioned against a background color pattern 60. The color of the droplet color patterns 62 is pre-determined and is different from the color of the background color pattern 60. The image of the droplet color patterns 62 against the background color pattern 60 is well defined and has substantially no migration of color at their interfaces.

The rotational molding process 10 is gravity controlled and not imparted by centrifugal forces. Any movement of the hollow cavity mold 14 during the First Initial Time Period of the oven cycle will greatly diminish the spot color impact of the droplet color patterns 62 against the background color pattern 60 that would result from the original placement of the First Color Pellets 80 and the First Color Powder 48. Further, because the size of the particles of the First Color Pellets 80 are larger than the Particles of the First Color Powder, the First Color Pellets will always tend to migrate to the interior of the part during bi-axial rotation. As such, an adhesive may be used to fix the pattern of the First Color Pellets 80 upon the inside surface 26 of the lower cavity 16. The process of color fixation to a given surface area of the hollow cavity mold 14 may also be assisted by the First Color Pellets 80 being made from a material which will melt or degrade faster than the First Color Powder 48 due to its melt index. Although not shown, the First Color Powder 48 may overlap a portion or completely cover the First Color Pellets 80.

Figure 9:
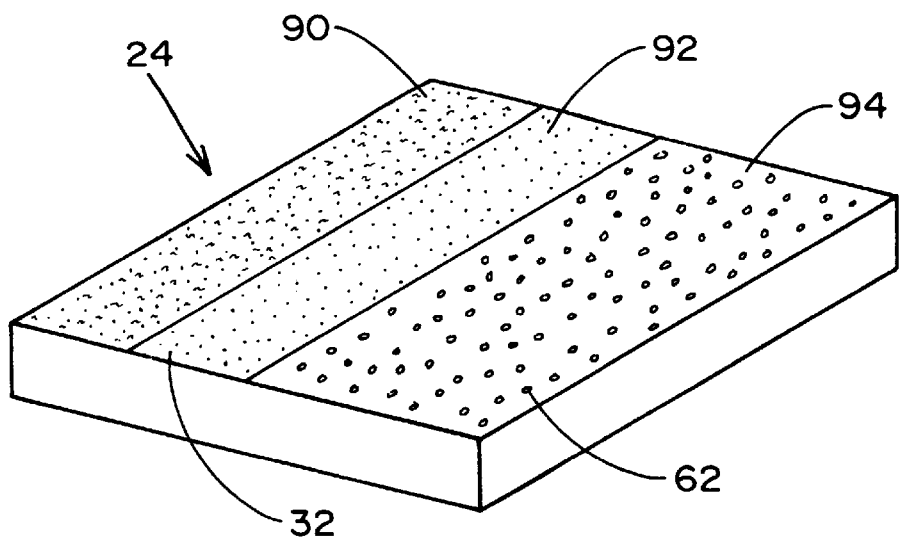
FIG. 9 is a perspective view of a product formed by a third embodiment of the rotomolding process of the present invention.
Figure 11:
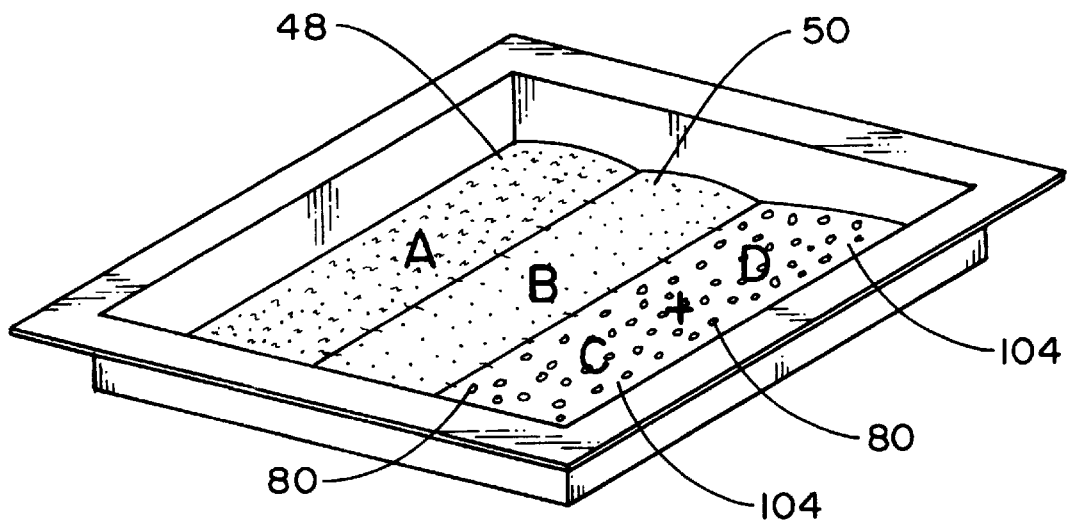
FIG. 11 is a perspective view showing a first color powder, a second color powder, a third color powder, and first color pellets selectively positioned in the lower cavity of the hollow cavity mold for use in the third embodiment of the rotomolding process.

Referring to FIGS. 9–11, wherein a third embodiment of the rotomolding process 10 is described. The product 24 formed by the rotomolding process 10 of the third embodiment comprises an outside surface 32 having a first color pattern 90 (for example, a dark blue color) fading into a second color pattern 92 (for example, a light blue color) fading into a background color pattern 94 (for example, a white color) and a plurality of droplet color patterns 62 (for example, a light blue color). The resulting color pattern of the third embodiment has the visual effect of a waterfall and unlike the first and second embodiment has a pre-determined and defined fading effect.

As shown by block 100, the rotomolding process 10 comprises the step of using First and Second Color Powders 48 and 50 as described in the first embodiment of the present invention. The First and Second Color Powders are of different colors and may for example have the colors of dark blue and light blue.

As shown by block 102, the rotomolding process 10 comprises the step of using a third color powder 104 which except for its color is similar to the First and Second Color Powders and which is used as a background color (hereinafter the "Third Color Powder 104"). The Third Color Powder 104 may have the color of white.

As shown by block 105, the rotomolding process 10 further comprises the step of using the First Color Pellets 80. The color of the First Color Pellets 80 may be the same color as the color of the Third Color Powder 104, namely, light blue.

As shown by block 106, the rotomolding process 10 further comprises the step of placing the First Color Pellets 80 on the inside surface 26 of the lower cavity 16. The pattern of the First Color Pellets 80 may be temporarily fixed by adhesive (not shown).

As shown by block 108, the rotomolding process 10 further comprises the step of placing the First, Second and Third Color Powders 48, 50 and 105 on the inside surface 26 of the lower cavity 16 and adjacent to the First Color Pellets 80.

As shown by block 110, the rotomolding process 10 further comprises the step of heating the hollow cavity mold 14 with no rotation during the First Initial Time Period to allow the First Color Powder 48, the Second Color Powder 50, the Third Color Powder 104, and the First Color Pellets 80 to form adequate epidermal layers on the inside surface 26 of the lower cavity 16.

As shown by block 112, the rotomolding process 10 further comprises the step of bi-axis rotation of the hollow cavity mold 14 about the major and minor axis while heating during the Final Time Period to completely melt the remaining material in the hollow cavity mold 14 to form a nominal and universal wall thickness for the entire product 24.

As shown by block 114, the process 10 further comprises the step of cooling the hollow cavity mold 14 to solidify the melted First Color Powder 48, the Second Color Power 50, the Third Color Powder 104, and the First Color Pellets 80.

As shown by block 116, the rotomolding process 10 further comprises the step of removing the product 24 from the hollow cavity mold 14. The resulting product 24 has an outside surface 32 having the first color pattern 90 (for example, a dark blue color) fading into the second color pattern 92 (for example, a light blue color) fading into the background color pattern 94 (for example, a white color) and the plurality of droplet color patterns 62 (for example, a light blue color). The resulting color pattern of the third embodiment has the visual effect of a waterfall and unlike the first and second embodiment has a pre-determined and defined fading effect. The amount of fading is controllable by the length of the Final Heating Period. A longer Final Heating Period causes the chemical bonds of epidermal layers corresponding to the First Color Powder 48, the Second Color Powder 50 and the Third Color Powder 105 to breakdown which results in the first color pattern 90 bleeding into the second color pattern 92 and the second color pattern 92 bleeding into the background color pattern 94.

Although not shown in the drawings, a fourth embodiment of the rotomolding process 10 may include the step of using a pre-cut template having a pre-determined pattern and an adhesive spray may be used to adhere the powder or pellets to any part of the interior of the hollow cavity mold 14. The effect of this additional step is to produce well defined borders between adjacent color patterns. In other embodiments, the color powders can be pre-formed with adhesive to specific areas of the cavity tool and covered over with another layer of color powder. Non-rotation of the hollow cavity mold 14 during the First Initial Time Period would allow both layers of the color powders to form the primary color design (first color patterns corresponding to the color powder applied with adhesive and an overall background color pattern corresponding to the overlayed color powder).

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A process for forming a product using a hollow cavity mold having a lower cavity and an upper cavity and a rotomolder machine having a oven, the process comprising the steps of:

(a) forming first and second color powders, said first and second color powders comprising a blend of a ground powder made from a virgin polyethylene having a particle size of about 35 mesh and first and second dry color pigments, respectively;

(b) placing said first and second color powders into a pre-determined pattern within the lower cavity of the hollow cavity mold;

(c) closing said hollow cavity mold;

(d) placing said hollow cavity mold into said oven;

(e) heating said hollow cavity mold with no rotation for a first period of time defined by the heating time necessary for a layer of said first and second color powders to melt in the desired pattern upon the lower cavity and form an epidermal layer;

(f) rotating the hollow cavity mold in a bi-axis manner while heating said hollow cavity mold for a second period of time defined by the heating time necessary to completely melt and combine the remaining first and second color powders in the hollow cavity mold into a sum color of the individual colors;

(g) cooling said hollow cavity mold to solidify the product; and (h) removing the product from said hollow cavity mold, the product comprising a pattern having a first color corresponding to said first color powder and a second color corresponding to said second color powder.

* * * * *